(12) United States Patent
Strieter

(10) Patent No.: US 11,181,172 B2
(45) Date of Patent: Nov. 23, 2021

(54) BELT DRIVE MECHANISM WITH GEAR BACK-UP

(71) Applicant: MANDO CORPORATION, Gyeonggi-do (KR)

(72) Inventor: Troy Strieter, Sebewaing, MI (US)

(73) Assignee: MANDO CORPORATION, Gyeonggi-Do (KR)

( * ) Notice: Subject to any disclaimer, the term of this patent is extended or adjusted under 35 U.S.C. 154(b) by 362 days.

(21) Appl. No.: 16/431,735

(22) Filed: Jun. 5, 2019

(65) Prior Publication Data

US 2019/0383371 A1 Dec. 19, 2019

Related U.S. Application Data

(60) Provisional application No. 62/685,264, filed on Jun. 14, 2018.

(51) Int. Cl.
*F16H 37/02* (2006.01)
*F16H 1/20* (2006.01)
*F16H 7/02* (2006.01)
*F16H 37/04* (2006.01)
*F16H 7/08* (2006.01)
*F16H 7/12* (2006.01)
*F16H 1/00* (2006.01)

(52) U.S. Cl.
CPC ............ *F16H 37/02* (2013.01); *F16H 1/20* (2013.01); *F16H 7/02* (2013.01); *F16H 37/04* (2013.01); *F16H 37/041* (2013.01); *F16H 37/042* (2013.01); *F16H 1/00* (2013.01); *F16H 7/1281* (2013.01); *F16H 2007/0844* (2013.01); *F16H 2007/0865* (2013.01); *F16H 2007/0893* (2013.01)

(58) Field of Classification Search
CPC ... F16H 1/20; F16H 1/00; F16H 37/04; F16H 37/042; F16H 37/041
USPC .......................................... 74/665 R
See application file for complete search history.

(56) References Cited

U.S. PATENT DOCUMENTS 4,577,527 A * 3/1986 Shackelford ........ B41F 13/0008
474/133
6,817,437 B2 * 11/2004 Magnus ................ B62D 5/006
180/403

(Continued)

FOREIGN PATENT DOCUMENTS

JP 2009-8121 1/2009

*Primary Examiner* — Henry Y Liu
(74) *Attorney, Agent, or Firm* — Ladas & Parry, LLP

(57) ABSTRACT

A belt drive mechanism with gear back-up comprises a driving pulley to which a driving gear is attached, a driven pulley to which a driven gear is attached, a drive belt drivingly connected between the driving and driven pulleys, and a back-up gear disposed between the driving and driven gears. When the drive belt is engaged with the driving and driven pulleys, teeth of the back-up gear are spaced apart from teeth of the driving and driven gears, and at least a portion of the teeth of the back-up gear are interposed between the teeth of the driving and driven gears. Thus, in a normal state, the drive belt is driven by the driving pulley and drives the driven pulley. However, in case of belt failure, the back-up gear is driven by the driven gear attached to the driving pulley and drives the driven gear attached to the driven pulley instead of the drive belt.

18 Claims, 8 Drawing Sheets

(56) References Cited

U.S. PATENT DOCUMENTS

| | | | | |
|---|---|---|---|---|
| 7,921,958 B2* | 4/2011 | Kang | ............... | B62D 5/04 |
| | | | | 180/444 |
| 8,342,992 B2* | 1/2013 | Deno | ............... | F16H 9/04 |
| | | | | 474/73 |
| 2010/0125015 A1* | 5/2010 | Deno | ............... | F16H 9/04 |
| | | | | 474/72 |
| 2014/0366832 A1* | 12/2014 | Tsunoda | ............ | B60W 10/08 |
| | | | | 123/192.2 |
| 2016/0070199 A1* | 3/2016 | Oh | ............... | F16H 1/20 |
| | | | | 399/258 |
| 2019/0084612 A1* | 3/2019 | Kirschenmann | ..... | B62D 5/0427 |

* cited by examiner

BELT DRIVE MECHANISM WITH GEAR BACK-UP

CROSS REFERENCE TO PARENT APPLICATION(S)

This application claims the benefit of U.S. Patent Application Ser. No. 62/685,264, filed on Jun. 14, 2018, entitled "BELT DRIVE REDUCTION MECHANISM WITH REDUNDANT GEAR DRIVE", which is all hereby incorporated by reference in its entirety.

CROSS REFERENCE TO RELATED PATENT APPLICATION(S)

This application is related to U.S. patent application Ser. No. 16/118,437, entitled "ELECTROMECHANICAL ACTUATOR PACKAGE WITH MULTI-STAGE BELT DRIVE MECHANISM", filed on Aug. 31, 2018; and U.S. patent application Ser. No. 16/118,434, entitled "ELECTROMECHANICAL ACTUATOR PACKAGE WITH BELT DRIVE MECHANISM FOR STEER-BY-WIRE HAND WHEEL ACTUATOR", filed on Aug. 31, 2018. All of these applications are incorporated herein by reference in their entireties.

BACKGROUND

Gears and belts transmit rotary motion from one shaft to another, often changing speed and torque in the process. Gear sets are generally used where the two shafts are close together. Belts and pulleys, or sheaves, on the other hand, link shafts that are farther apart.

A belt is a loop of flexible material used to link two or more rotating shafts mechanically, most often parallel. Belts may be used as a source of motion, to transmit power efficiently or to track relative movement. For example, belts are looped over pulleys and may have a twist between the pulleys, and the shafts need not be parallel.

Belts are the cost-effective utility for power transmission between shafts that may not be axially aligned. Power transmission is achieved by specially designed belts and pulleys. They run smoothly and with little noise, and cushion motor and bearings against load changes, albeit with less strength than gears or chains. However, fatigue, more so than abrasion, is the culprit for most belt problems. This wear is caused by stress from rolling around the pulleys. Low belt tension, excessive slippage, adverse environmental conditions, and belt overloads caused by shock, vibration, or belt slapping all contribute to belt fatigue. Accordingly, belts may become worn with use and sometimes break at inappropriate times.

It would be desirable to have an apparatus and method that take into account some of the issues discussed above, as well as other possible issues.

SUMMARY

The features and advantages of the present disclosure will be more readily understood and apparent from the following detailed description, which should be read in conjunction with the accompanying drawings, and from the claims which are appended to the end of the detailed description.

According to various embodiments of the present disclosure, a belt drive mechanism with gear back-up may comprise a driving pulley to which a driving gear is attached, a driven pulley to which a driven gear is attached, a drive belt drivingly connected between the driving and driven pulleys, a drive belt drivingly connected between the driving pulley and the driven pulley, and a back-up gear disposed between the driving gear of the driving pulley and the driven gear of the driven pulley. In a normal operation, such as a state that the drive belt is engaged with the driving and driven pulleys, teeth of the back-up gear may be spaced apart from teeth of either or both of the driving gear attached to the driving pulley and the driven gear attached to the driven pulley while at least a portion of the teeth of the back-up gear may be interposed between the teeth of the driving and driven gears attached to the driving and driven pulleys. The back-up gear may be configured to operably connect the driving gear, attached to the driving pulley, to the driven gear, attached to the driven pulley, only in case of belt failure, for example, but not limited to, when the drive belt breaks or is improperly engaged, becomes loose, or the like.

Therefore, during the normal operation, the drive belt may be driven by the driving pulley and drive the driven pulley. However, when the belt failure happens, the back-up gear may be driven by the driving gear attached to the driving pulley and drive the driven gear attached to the driven pulley to drive the driven pulley as a back-up for the drive belt.

According to some embodiments of the present disclosure, a belt drive mechanism with gear back-up may comprise a first pulley and gear assembly comprising a first pulley and a first gear which are coupled to each other, a second pulley and gear assembly comprising a second pulley and a second gear which are coupled to each other, a drive belt drivingly connected between the first pulley and the second pulley, and a back-up gear disposed between the first gear coupled to the first pulley and the second gear coupled to the second pulley. In a state that the drive belt is engaged with the first and second pulleys, teeth of the back-up gear may be spaced apart from teeth of at least one of the first and second gears coupled to the first and second pulleys while at least a portion of the teeth of the back-up gear may be interposed between the teeth of the first and second gears coupled to the first and second pulleys. The drive belt may be configured to operably connect the first pulley to the second pulley in a state that the drive belt is engaged with the first and second pulleys. However, in a state that the drive belt is disengaged with at least one of the first and second pulleys, the back-up gear may be configured to operably connect the first gear, coupled to the first pulley, to the second gear, coupled to the second pulley, instead of the drive belt. The teeth of the back-up gear may be rotatably connected with the drive belt. The belt drive mechanism may further comprise an idler disposed adjacent to the drive belt and configured to adjust a tension of the drive belt.

A better understanding of the nature and advantages of the present disclosure may be gained with reference to the detailed description and the drawings below.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
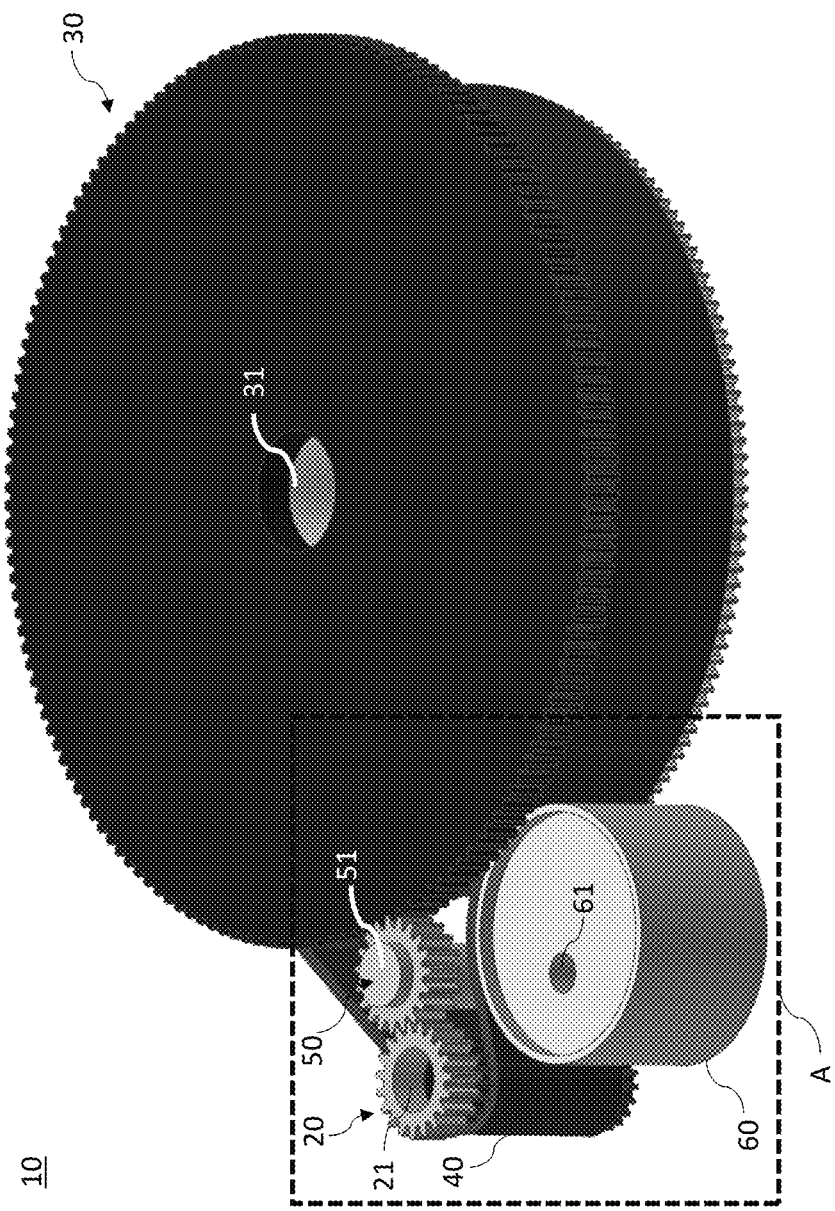
FIG. 1 is a perspective view of a belt drive mechanism with gear back-up according to an embodiment of the present disclosure.
Figure 2:
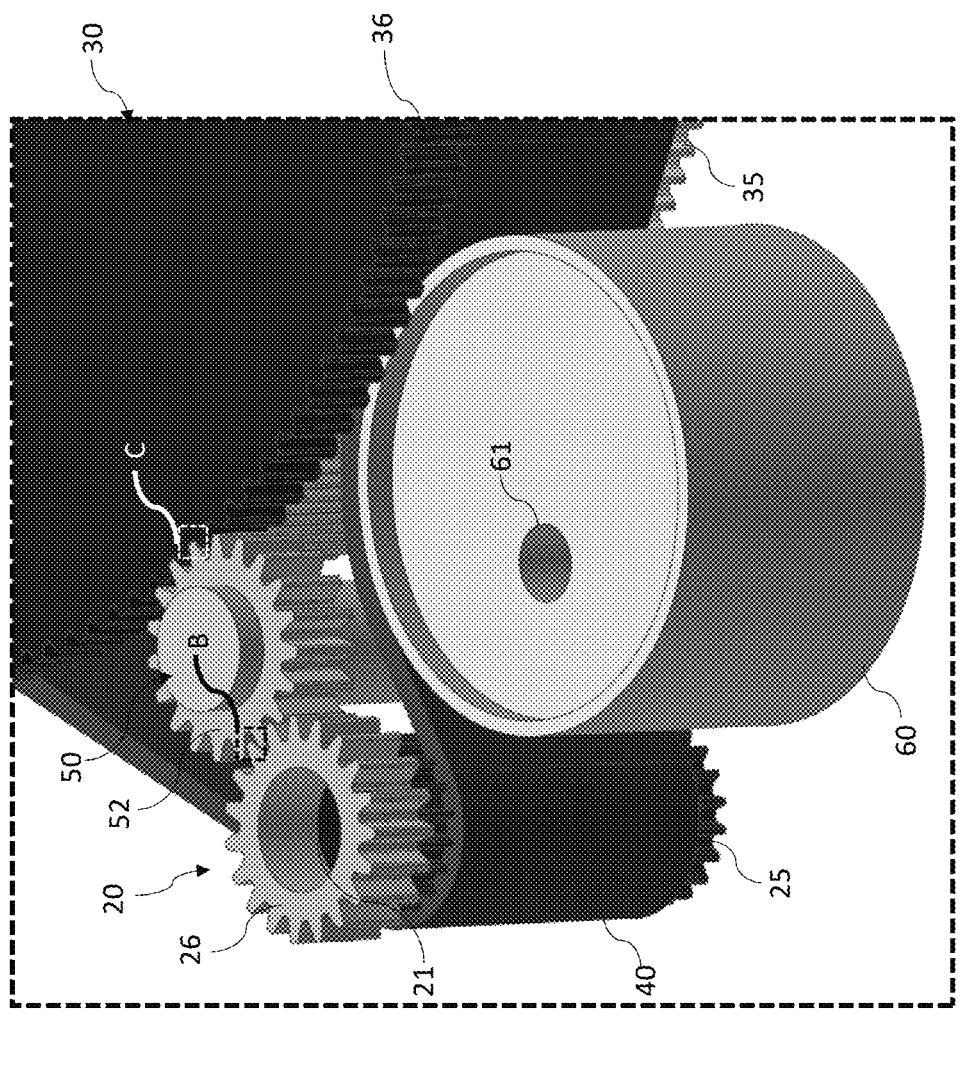
FIG. 2 is an enlarged view of a portion A of the belt drive mechanism of FIG. 1 according to an embodiment of the present disclosure.
Figure 4:
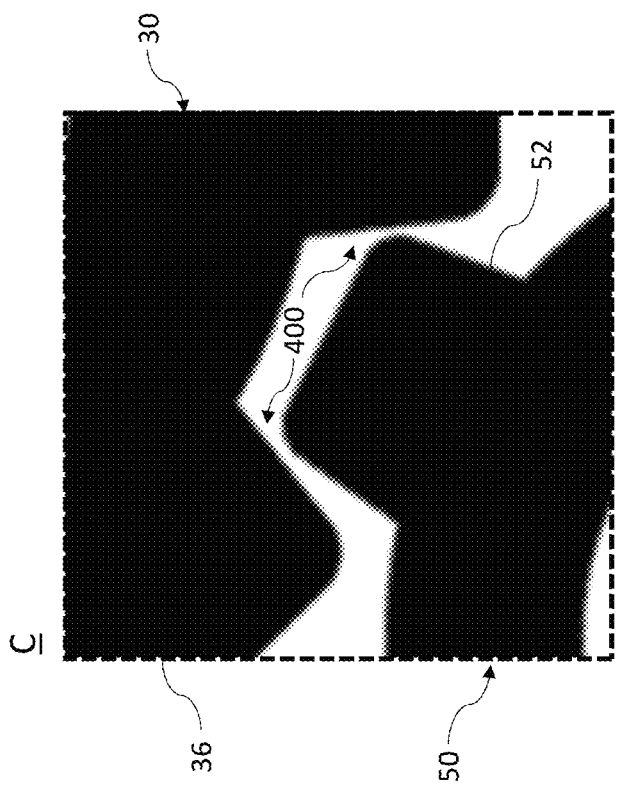
FIG. 4 is an enlarged view of teeth portions of a back-up gear and a driven gear coupled to a driven pulley according to an embodiment of the present disclosure.
Figure 3:
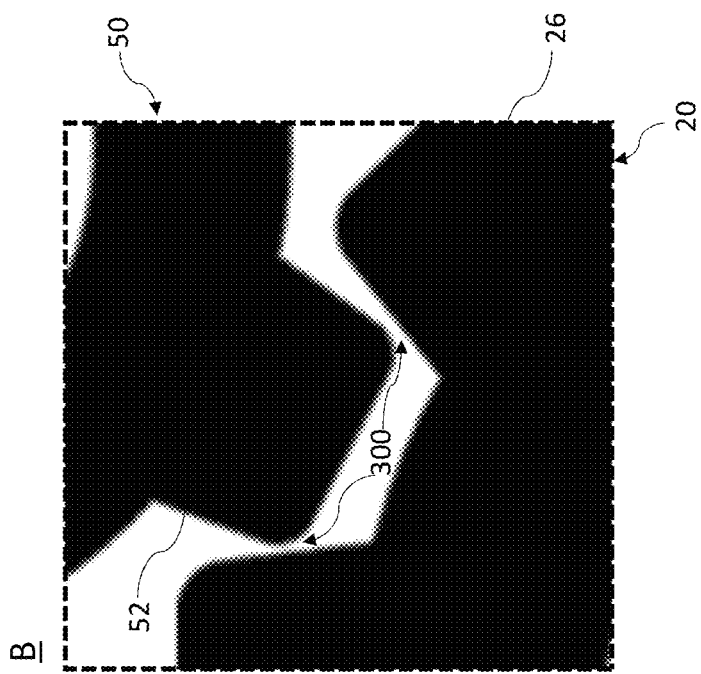
FIG. 3 is an enlarged view of teeth portions of a back-up gear and a driving gear coupled to a driving pulley according to an embodiment of the present disclosure.
Figure 5:
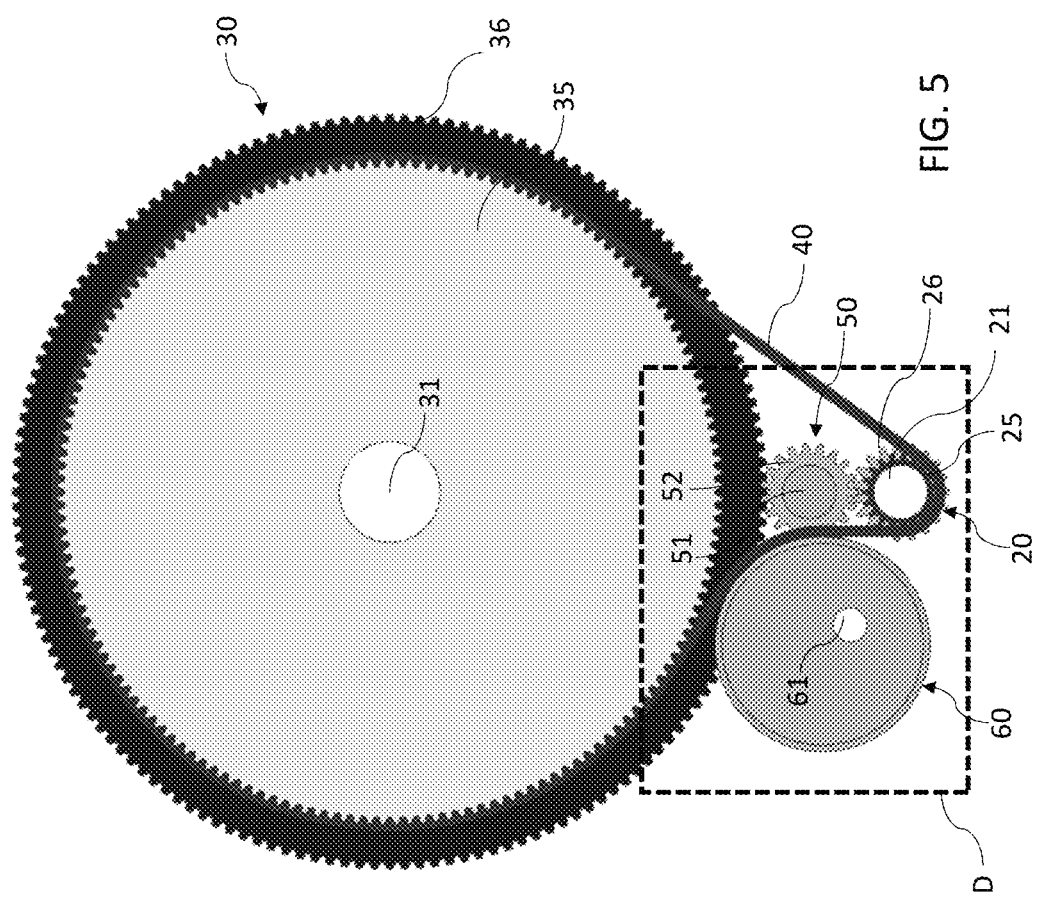
FIG. 5 is a bottom plan view of a belt drive mechanism with gear back-up according to an embodiment of the present disclosure.
Figure 6:
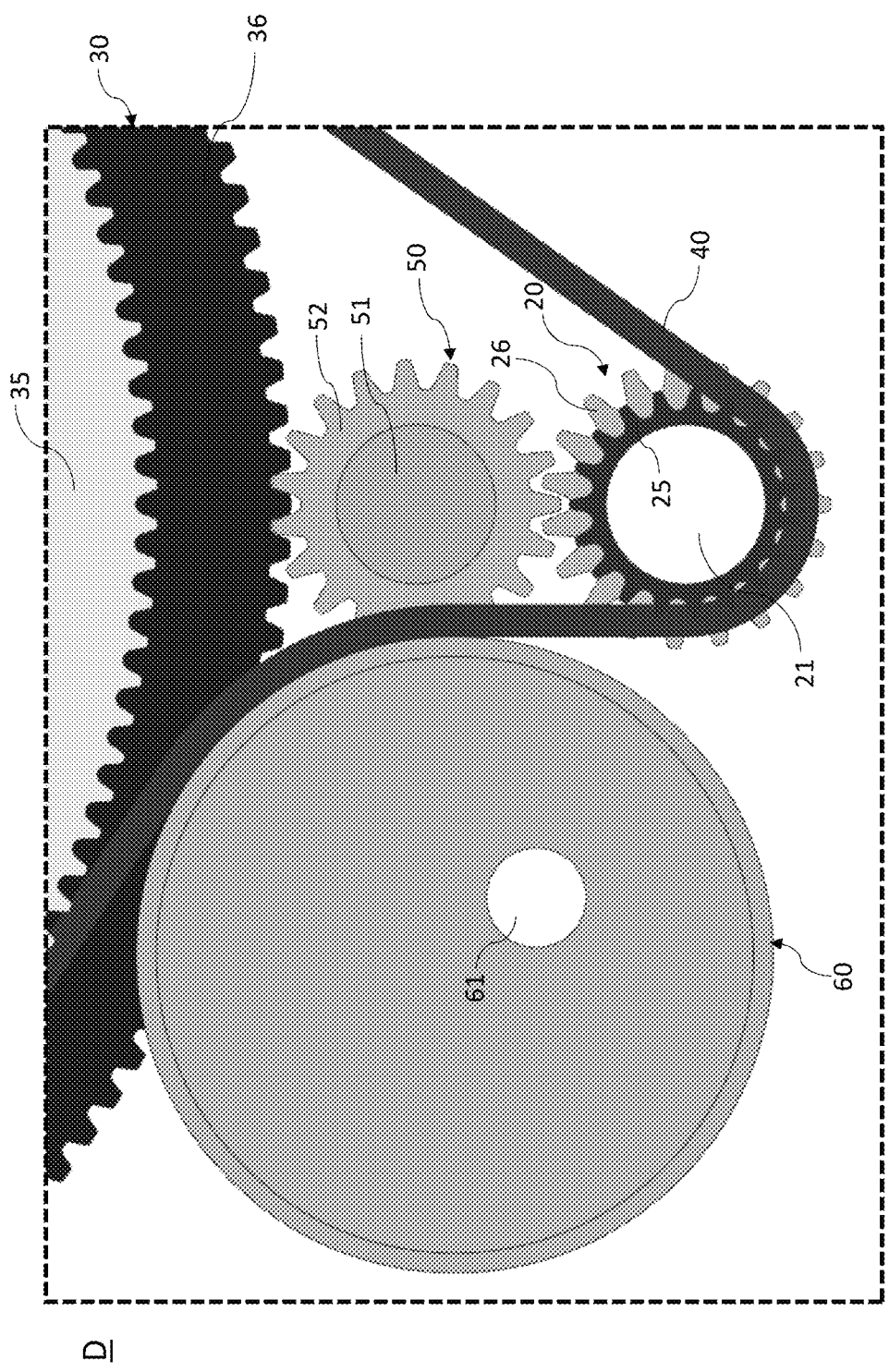
FIG. 6 is an enlarged view of a portion D of the belt drive mechanism of FIG. 5 according to an embodiment of the present disclosure.
Figure 7:
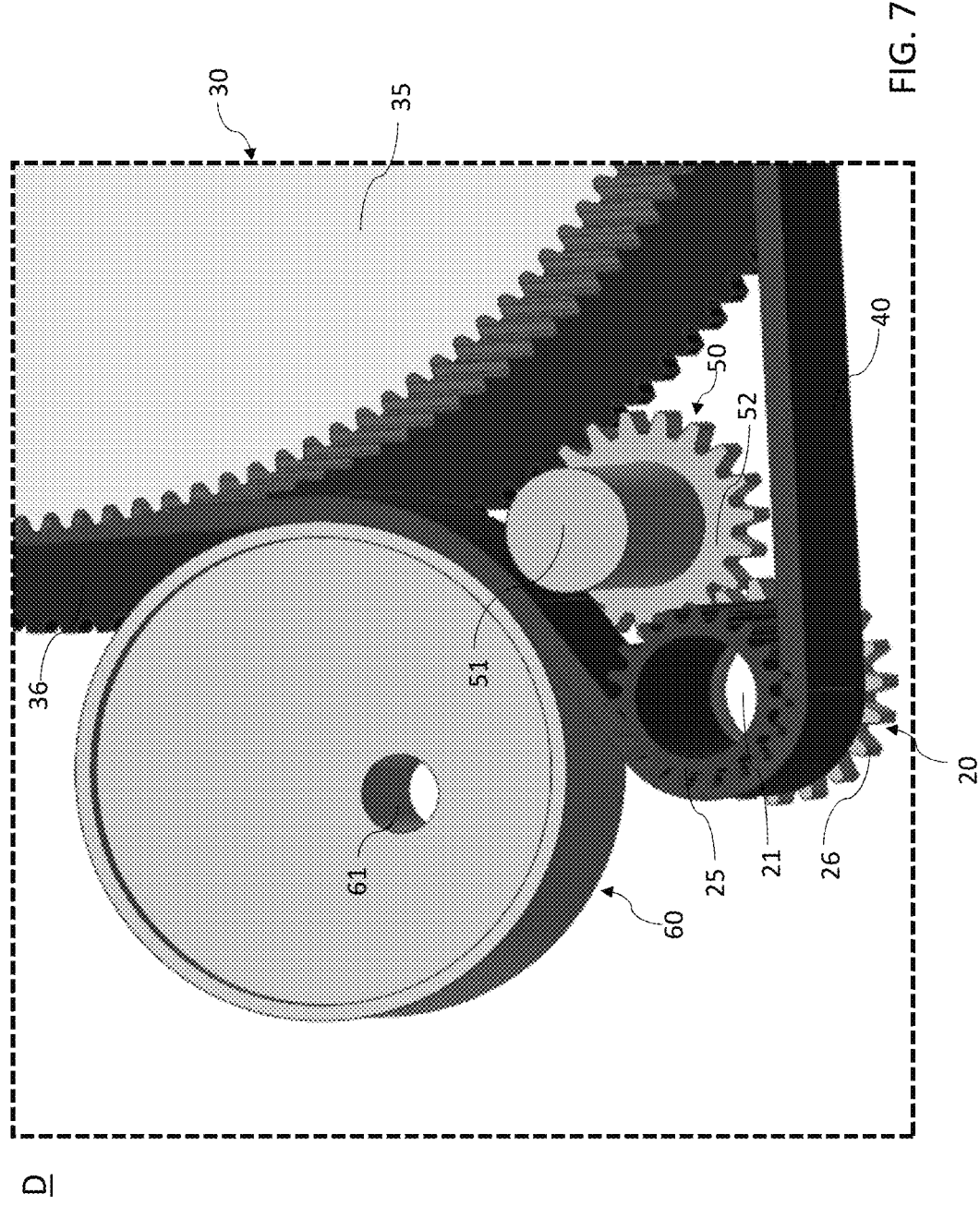
FIG. 7 is a bottom perspective enlarged view of a portion D of the belt drive mechanism of FIG. 5 according to an embodiment of the present disclosure.

FIG. 1 is a perspective view of a belt drive mechanism with gear back-up according to an embodiment of the present disclosure. FIG. 2 is an enlarged view of a portion A of the belt drive mechanism of FIG. 1 according to an embodiment of the present disclosure. FIG. 3 is an enlarged view of teeth portions of a back-up gear and a driving gear attached to a driving pulley according to an embodiment of the present disclosure. FIG. 4 is an enlarged view of teeth portions of a back-up gear and a driven gear coupled to a driven pulley according to an embodiment of the present disclosure. FIG. 5 is a bottom plan view of a belt drive mechanism with gear back-up according to an embodiment of the present disclosure. FIG. 6 is an enlarged view of a portion D of the belt drive mechanism of FIG. 5 according to an embodiment of the present disclosure. FIG. 7 is a bottom perspective enlarged view of a portion D of the belt drive mechanism of FIG. 5 according to an embodiment of the present disclosure.

A belt drive mechanism 10 may comprise a first pulley and gear assembly 20, a second pulley and gear assembly 30, a drive belt 40, and a back-up gear 50. The belt drive mechanism 10 may further comprise an idler 60.

The first pulley and gear assembly 20 may comprise a first pulley 25 and a first gear 26. The second pulley and gear assembly 30 may comprise a second pulley 35 and a second gear 36. As long as the first and second pulleys and gear assemblies 20 and 30 are turned in the appropriate direction, either pulley and gear assembly can serve as the driving or driven pulley or gear. For illustration purposes only, in the exemplary embodiments of the present disclosure, the first pulley 25 and the first gear 26 are described as a driving pulley or gear and the second pulley 35 and the second gear 36 is described as a driven pulley or gear. However, alternatively, the first pulley and gear assembly 20 can be a driven pulley or gear and the second pulley and gear assembly 30 can be a driving pulley or gear, and each of the first and second pulley and gear assemblies 20 and 30 can function as both driving and driven pulleys or gears.

The first (or driving) pulley 25 may be directly or indirectly coupled to the first gear 26. For example, the first gear 26 is fixedly attached to one of ends of the first pulley 25.

Figure 8:
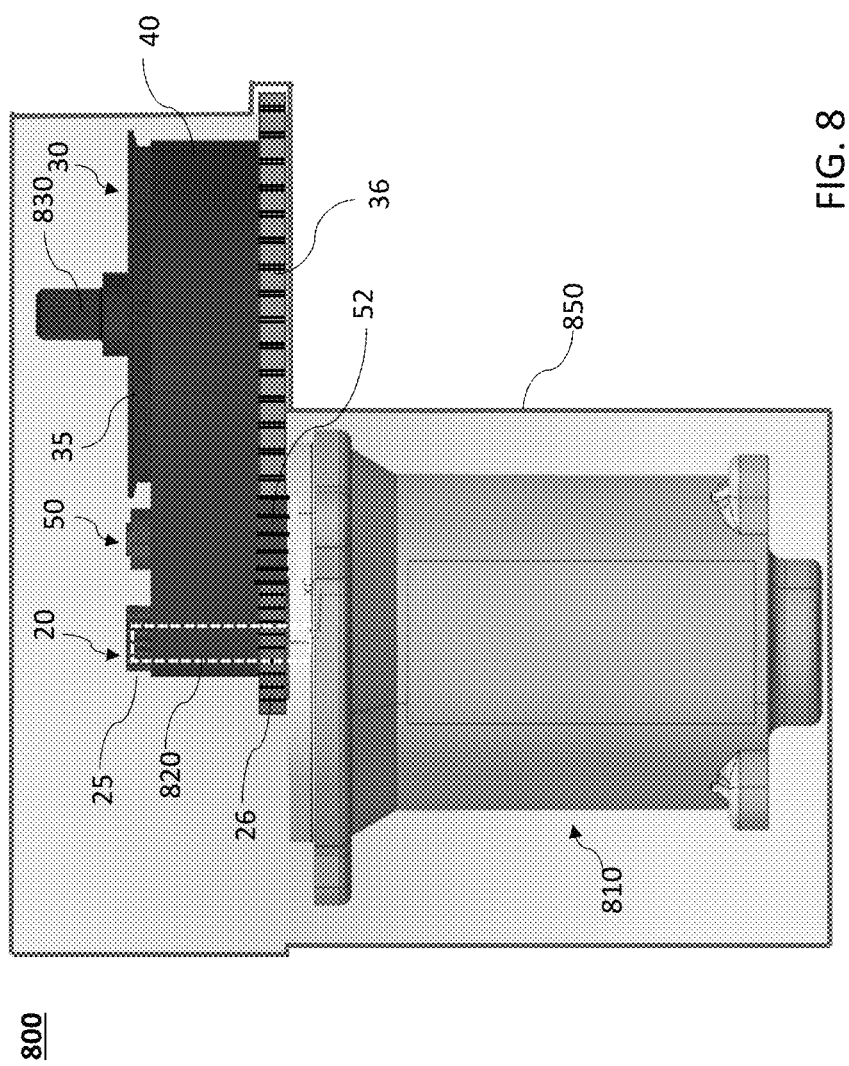
FIG. 8 illustrates an actuator package having a single stage belt drive mechanism with gear back-up according to an exemplary embodiment of the present disclosure.
Figure 9:
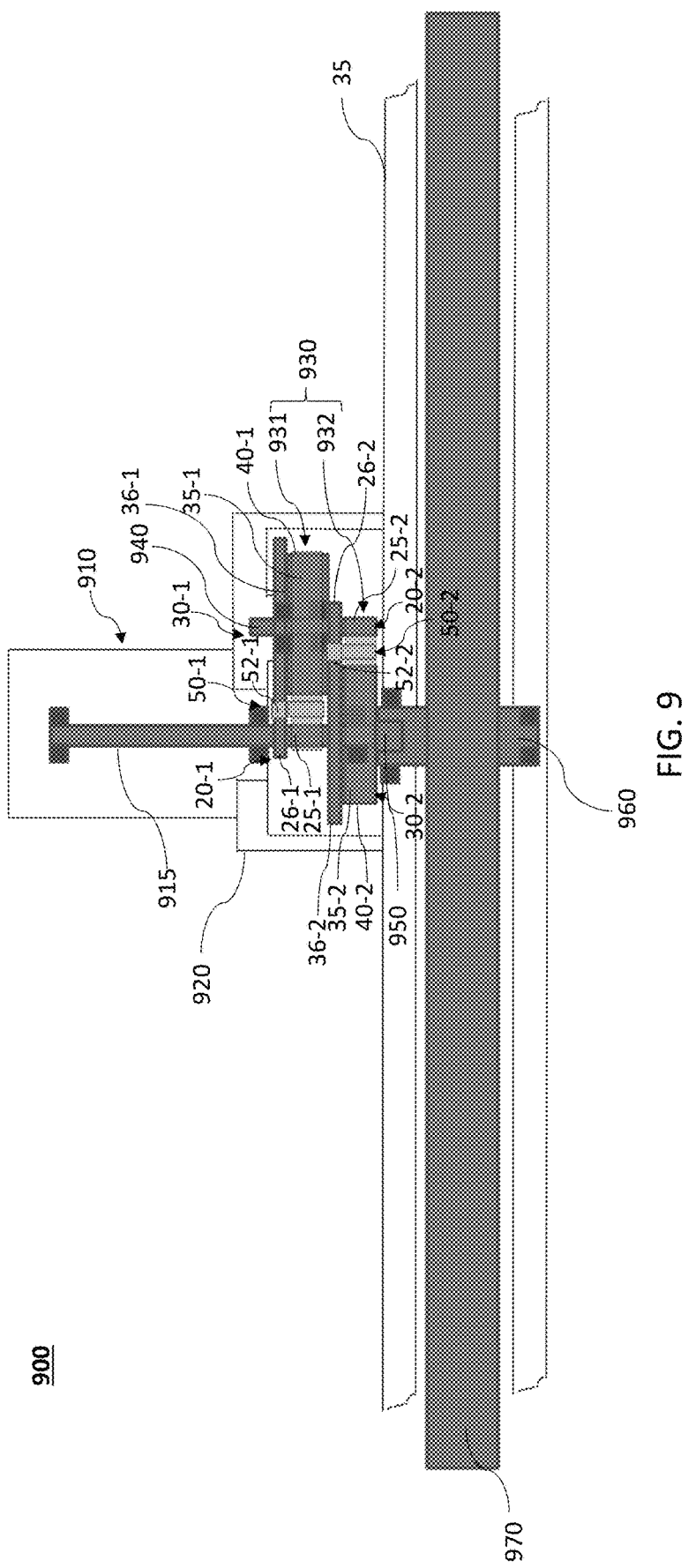
FIG. 9 illustrates an actuator package having a double stage belt drive mechanism with gear back-up according to an exemplary embodiment of the present disclosure.

The first pulley 25 may be fixed to and rotate with an axle 21 which may be power driven. The first pulley 25 may be directly or indirectly connected to a driving power source such as an electric motor. For example, as illustrated in FIGS. 8 and 9, the axle 21 of the first pulley 25 can be implemented as a shaft 820 or 915 of a motor 810 or 910 such that the shaft 820 or 915 of the motor 810 or 910 is fixedly attached to the first pulley 25 at the axle 21. Alternatively, the first pulley 25 can be indirectly coupled to the driving power source through one or combination of belts, shafts, pulleys, gears and the likes.

The second (or driven) pulley 35 may directly or indirectly coupled to the second gear 36. For example, the second gear 36 is fixedly attached to one of ends of the second pulley 35.

The second pulley and gear assembly 30 may be driven by the first pulley and gear assembly 20. The second pulley and gear assembly 30 is operably connected to the first pulley and gear assembly through the drive belt 40 in a normal state, or operably connected to the first pulley and gear assembly 200 through the back-up gear 50 or any other gear(s) associated with the back-up gear 50 in an event of belt failure. This will be described in detail later. The second pulley 35 may be provided which is fixed to and causes rotation of an axle 31. For example, the axle 31 of the second pulley 35 may be coupled to a rotatable load. As shown in FIGS. 8 and 9, the axle 31 of the second pulley 35 may be implemented as an output shaft 830 or 950.

Each of the first and second pulleys 25 and 35 has an outer surface that engages an inner surface of the drive belt 40. The surfaces of the first and second pulleys 25 and 35 can have any suitable contour or texture to help ensure a gripping contact between the drive belt 40 and the pulleys 25, 35. For example, the outer surfaces of the pulleys 25 and 35 and the inner surface of the drive belt 40 can include toothed mating protrusions and/or notches formed therein.

The drive belt 40 may wrap around the first pulley 25 to the second pulley 35. The drive belt 40 is fit relatively snugly about the outer circumferences of the first pulley 25 and the second pulley 35. The drive belt 40 may drivingly connect between the first pulley 25 and the second pulley 35. Thus, rotational movement of the first pulley 25 causes rotation of the second pulley 35. The drive belt 40 may have teeth on one or both sides thereof. The teeth of the drive belt 40 may correspond to the teeth of one or more of the first pulley 25, second pulley 35, and back-up gear 50. The drive belt 40 may be made from any suitable material or combination of materials flexible enough to loop around the pulleys 25 and 35 and maintain engagement with the outer surfaces of the pulleys 25 and 35 during rotation thereof. The drive belt 40 may be a vee belt or a cog belt, or may be made of individual links forming a chain. The drive belt 40 may be made of an elastomeric material, and may include internal metallic reinforcing members.

In a normal state (for example, the drive belt 40 is properly engaged with the first and second pulleys 35), the teeth 52 of the back-up gear 50 may be spaced apart from the teeth of either one or both the first gear 26 of the first pulley 25 and the second gear 36 of the second pulley 35 while the teeth 52 of the back-up gear 50 are interposed between the teeth of both the first gear 26 of the first pulley 25 and the second gear 36 of the second pulley 35. As illustrated in FIG. 3, there may be clearance or gap 300 between the teeth of the first gear 26 of the first pulley 25 and the teeth 52 of the back-up gear 50, and as shown in FIG. 4, there may be clearance or gap 400 between the teeth of the second gear 36 of the second pulley 35 and the teeth 52 of the back-up gear 50. Therefore, when the drive belt 40 is operably engaged with the first and second pulleys 25 and 35, the teeth 52 of the back-up gear 50 do not contact the teeth of either one or both the first gear 26 of the first pulley 25 and the second gear 36 of the second pulley 35. Because the back-up gear 50 is rotatably in contact with the drive belt 40, the drive belt 40 rotates the back-up gear 50 so that the clearance 300 between the teeth of the first gear 26 of the first pulley 25 and the teeth of the back-up gear 50 and/or the clearance 400 between the teeth of the second gear 36 of the second pulley 35 and the teeth of the back-up gear 50 can be kept while the first gear 26 of the first pulley 25 and the second gear 36 of the second pulley 35 rotate.

The first gear 26 of the first pulley 25, the second gear 36 of the second pulley 35, and the back-up gear 50 may have any suitable shapes, and the first pulley and gear assembly 20, the second pulley and gear assembly 30, and a back-up gear 50 may be disposed at any appropriate distances therebetween so that the back-up gear 50 cannot contact the first gear 26 of the first pulley 25 and/or the second gear 36 of the second pulley 35 in the normal operation (for example, the drive belt 40 is operatively connected between the first pulley 25 and the second pulley 35) while the back-up gear 50 can operatively engage with the first gear 26 of the first pulley 25 and the second gear 36 of the second pulley 35 in the event of belt failure (for instance, the drive belt 40 breaks or become loose). In one example, the size of the teeth 52 of the back-up gear 50 may be smaller than the size of a smaller one of untoothed portions (e.g. spaces formed between the teeth of the gear) of the first gear 26 and the second gear 36. In another example, the teeth of the back-up gear 50 has the shorter width in a tangential direction than the untoothed portions of the first gear 26 and second gear 36. In still another example, the radii of the teeth 52 of the back-up gear 50 from the untoothed portion in a radial direction may be shorter than those of the first gear 26 and the second gear 36. However, the back-up gear 50 may have the longer radii of the teeth from the untoothed portion in the radial direction than the first gear 26 and second gear 36 by elongating the distances between the axle 21 of the first pulley and gear assembly 20 and the axle 51 of the back-up gear 50 and/or the distances between the axle 31 of the second pulley and gear assembly 30 and the axle 51 of the back-up gear 50.

The belt drive mechanism 10 may further comprise the idler 60. The idler 60 is used to engage the drive belt 40 to provide appropriate tension in the belt. The idler 60 may be disposed adjacent to the drive belt 40 and configured to adjust a tension of the drive belt 40. The idler 60 can be operatively in contact with the drive belt 40. The idler 60 may contact the drive belt 40 at a location between the first pulley and gear assembly 20 and the second pulley and gear assembly 30. The idler 60 may be, for example, but not limited to, an eccentrically mounted, circular idler pulley. The eccentric idler pulley can rotate about a shaft 61 which is eccentrically offset from the center of the eccentric idler pulley.

In operation, in the normal state of the belt drive mechanism 10, the drive belt 40 rotatably or drivingly connects between the first pulley 25 and the second pulley 35. For example, when the drive belt 40 is properly or operatively engaged with the first and second pulleys 25 and 35, the first (or driving) pulley 25 may drive the drive belt 40, and then the drive belt 40 may drive the second (or driven) pulley 35.

However, in the normal state, the back-up gear 50 does not involve or affect the driving operation of the first and second pulley and gear assemblies 20 and 30. For instance, when the drive belt 40 is properly or operatively engaged with the first and second pulleys 25 and 35, the teeth 52 of the back-up gear 50 do not contact the teeth of one or both of the first gear 26 fixed to the first pulley 25 and the second gear 36 fixed to the second pulley 35. The teeth 52 of the back-up gear 50 are interposed between the teeth of the first and second gears 26 and 36 fixed to the first and second pulleys 25 and 35. However, during the normal state that the drive belt 40 is properly positioned, the teeth 52 of the back-up gear 50 are spaced apart from and cannot contact the teeth of the first and second gears 26 and 36 fixed to the first and second pulleys 25 and 35 as illustrated in FIGS. 3 and 4. Because the back-up gear 50 is rotatably in contact with the drive belt 40, the drive belt 40 rotates the back-up gear 50 so that the clearance 300 between the teeth of the first gear 26 of the first pulley 25 and the teeth 52 of the back-up gear 50 and the clearance 400 between the teeth of the second gear 36 of the second pulley 26 and the teeth 52 of the back-up gear 50 can be kept while the first and second pulleys 25 and 35 rotate.

In the event of belt failure, such as break, disengagement or improper engagement of the drive belt 40, the drive belt 40 can neither be driven by the first pulley 25 nor drive the second pulley 35. The drive belt 40 cannot also rotate the back-up gear 50. The clearance 300 between the teeth of the first gear 26 of the first pulley 25 and the teeth 52 of the back-up gear 50 and the clearance 400 between the teeth of the second gear 36 of the second pulley 35 and the teeth 52 of the back-up gear 50 maintained by the drive belt 40 may disappear. As the first pulley 25 which is a driving pulley rotates, the teeth of the first gear 26 fixed to the first pulley 25 start to operably contact the teeth 52 of the back-up gear 50 and therefore the first gear 26 can rotate the back-up gear 50. Subsequently, the teeth 52 of the back-up gear 50 rotated by the first gear 26 of the first pulley 25 operably contact the teeth of the second gear 36 of the second pulley 26, and the back-up gear 50 can rotate the second gear 36. Accordingly, when the drive belt 40 malfunctions, the back-up gear 50 can perform as back-up the function of the drive belt 40 drivingly connecting the first pulley and gear assembly 20 to the second pulley and gear assembly 30.

Thus, in the normal state that the drive belt 40 is properly positioned or engaged with the first pulley 25 and the second pulley 35, the drive belt 40 operably connects between the first pulley 25 and the second pulley 35. However, when the drive belt 40 is disengaged or improperly engaged with at least one of the first and second pulleys 25 and 35, the back-up gear 40 operably connects between the first gear 26 fixed to the first pulley 25 and the second gear 36 fixed to the second pulley 35 instead of the drive belt 40.

Alternatively, the back-up gear 50 can be operatively in contact with either one of the first gear 26 of the first pulley 25 or the second gear 36 of the second pulley 35 in a normal state that the drive belt 40 is engaged with the first and second pulleys 25 and 35. In the alternative exemplary embodiment, the back-up gear 50 does not contact the drive belt 40. Instead, during the normal operation, one of the first gear 25 or the second gear 35 rotates the back-up gear 50 and the other gear does not contact the back-up gear 50. For example, in the state that the drive belt 40 is engaged with the first and second pulleys 25 and 35, the teeth of the first gear 26 of the first pulley 25 interlock with the teeth 52 of the back-up gear 50 and the first gear 26 rotates the back-up gear 50 while the back-up gear 50 does not contact the second gear 36. However, when the drive belt 40 is disengaged with one of the first and second pulleys 25 and 35 during operation, the rotation of the back-up gear 50 rotated by the first gear 26 causes to rotate the second gear 36.

FIG. 8 illustrates an actuator package having a single stage belt drive mechanism with gear back-up according to an exemplary embodiment of the present disclosure. The actuator package 800 can be included in a brake actuator a steering actuator such as a steer-by-wire hand wheel actuator.

A motor 810 may be fixedly mounted in a housing 850. In the exemplary embodiment, the motor 810 may be disposed in the tubular cavity formed in the housing 850 and be fixed to a lower part of the housing 850. The motor 810 may be an electric motor, and may include a motor rotor shaft 820.

The first (or driving) pulley and gear assembly 20 including the first pulley 25 and first gear 26 may be attached to the motor rotor shaft 820. The belt drive 40 may operably couple the first (or driving) pulley 25 to the second (or driven) pulley 35. The back-up gear 50 may be disposed between the first gear 26 and the second gear 36. The first and second gears 26 and 36 may be fixedly attached to the first and second pulleys 25 and 35, respectively. The second (or driven) pulley and gear assembly 30 may be associated with the output shaft 830. For instance, the output shaft 830 may be formed directly on a surface of the second (or driven) pulley and gear assembly 30 or fixedly coupled to the second (or driven) pulley and gear assembly 30. The output shaft 830 may have various shapes that can be coupled to a part of a steering column assembly, for example, but not limited to a handwheel shaft, a steering shaft, a steering column or any shaft directly or indirectly connected to the handwheel shaft, the steering shaft or the steering column. In one example, the output shaft 830 may be formed as a protrusion extending from one side of the second (or driven) pulley and gear assembly 30, such as a toothed, threaded or splined shaft to prevent or minimize rotational lash. In another example, the output shaft 830 may be formed as a toothed, threaded or splined bore that can receive a part of the steering column assembly to prevent or minimize rotational lash. In the exemplary embodiment, the output shaft 830 may be attached to a shaft directly or indirectly connected to a handwheel to generate axial force for supplying resistive torque.

The details about the first (or driving) pulley and gear assembly 20, the second (or driven) pulley and gear assembly 30, the drive belt 40 and the back-up gear 50 are described above.

FIG. 9 illustrates an actuator package having a double stage belt drive mechanism with gear back-up according to an exemplary embodiment of the present disclosure. An actuator package 900 can be included in a brake actuator or a steering actuator such as a single pinion steering gear mechanism.

A motor 910 may be fixedly mounted in a housing 920. The motor 910 may be disposed in the tubular cavity formed in the housing 920 and be fixed to an upper part of the housing 920. The motor 910 may an electric motor, and includes a motor rotor shaft 915.

The actuator package 900 has a dual-stage belt drive mechanism 930 configured to multiply torque from the motor 910 to supply force to a steering gear pinion 960 via an actuator output 950. The dual-stage belt drive mechanism 930 comprises a first stage belt assembly 931 and a second stage belt assembly 932. The first stage belt assembly 931 comprises a first stage driving pulley and gear assembly 20-1, a first stage driven pulley and gear assembly 30-1, and a first stage drive belt 40-1, and a first stage back-up gear 50-1. The second stage belt assembly 932 comprises a second stage driving pulley and gear assembly 20-2, a second stage driven pulley and gear assembly 30-2, and a second stage drive belt 40-2, and a second stage back-up gear 50-2. The first stage driving pulley and gear 20-1 assembly and the second stage driving pulley and gear assembly 20-2 of FIG. 9 are described as the first pulley and gear assembly 20 above, the first stage driven pulley and gear assembly 30-1 and the second stage driven pulley and gear assembly 30-2 of FIG. 9 are described as the second pulley and gear assembly 30 above, the first stage drive belt 40-1 and the second stage drive belt 40-2 of FIG. 9 are described as the drive belt 40 above, and the first stage back-up gear 50-1 and the second stage back-up gear 50-2 are described as the back-up gear 50 above.

The axle of the first stage driven pulley or gear 30-1 and the axle of the second stage driving pulley or gear 20-2 are attached to a connecting shaft 940. The connecting shaft 940 may connect the first stage driven pulley 35-1 and/or the first stage driven gear 36-1 of the first stage belt assembly 931 to the second stage driving pulley 25-2 and/or the second stage driving gear 26-2 of the second stage belt assembly 932 in order to deliver torque of the first stage driven pulley and gear assembly 30-1 to the second stage driving pulley and gear assembly 20-2.

The second stage driven gear or pulley 30-2 may be associated with an actuator output 950. The actuator output 950 may be formed directly on a side of the second stage driven pulley and gear assembly 30-2 or fixedly coupled to the second stage driven gear and pulley assembly 30-2. The actuator output 950 may have various shapes that can be coupled to the steering gear pinion 960. For example, the actuator output 950 may be formed as a protrusion extending from one side of the second stage driven pulley and gear assembly 30-2, such as a toothed, threaded or splined shaft to prevent or minimize rotational lash. Alternatively, the actuator output 950 may be formed as a toothed, threaded or splined bore that can receive a part of the steering gear pinion 960 to prevent or minimize rotational lash. The steering gear pinion 960 can be rotated with the rotation of the actuator output 950. The rotation of the steering gear pinion 960 can linearly move a steering gear rack 970 disposed in a steering rack housing 980.

In the embodiment of the single pinion steering gear mechanism of the present disclosure, the actuator package 900 comprises the first stage back-up gear 50-1 and the second stage back-up gear 50-2 as a back-up for the first stage drive belt 40-1 and the second stage drive belt 40-2. During the normal operation, the steering mechanism 900 can be driven by the first stage drive belt 40-1 and the second stage drive belt 40-2. However, in the event of belt failure, the steering mechanism 900 can still maintain torque transfer and rack position because the first stage back-up gear 50-1 and/or the second stage back-up gear 50-2 can transfer the torque of the EPS motor 910 to the steering gear rack 970 instead of the first stage drive belt 40-1 and the second stage drive belt 40-2.

When introducing elements of various aspects of the present invention or embodiments thereof, the articles "a", "an", "the" and "said" are intended to mean that there are one or more of the elements. The terms "comprising", "including" and "having" are intended to be inclusive and mean that there may be additional elements other than the listed elements. Moreover, the use of "top" and "bottom", "front" and "rear", "above" and "below" and variations of these and other terms of orientation is made for convenience, but does not require any particular orientation of the components.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A belt drive mechanism with gear back-up, comprising:
    a first pulley and gear assembly comprising a first pulley and a first gear which are coupled to each other;
    a second pulley and gear assembly comprising a second pulley and a second gear which are coupled to each other;
    a drive belt drivingly connected between the first pulley and the second pulley; and
    a back-up gear disposed between the first gear coupled to the first pulley and the second gear coupled to the second pulley,
    wherein, in a state that the drive belt is engaged with the first and second pulleys, teeth of the back-up gear are spaced apart from teeth of at least one of the first gear coupled to the first pulley and the second gear coupled to the first pulley while at least a portion of the teeth of the back-up gear is interposed between the teeth of the first gear coupled to the first pulley and the second gear coupled to the first pulley.

2. The belt drive mechanism of claim 1, wherein the first pulley is a driving pulley and the second pulley is a driven pulley.

3. The belt drive mechanism of claim 1, wherein:
    the drive belt is configured to operably connect the first pulley to the second pulley in a state that the drive belt is engaged with the first and second pulleys, and
    the back-up gear is configured to operably connect the first gear, coupled to the first pulley, to the second gear, coupled to the second pulley, in a state that the drive belt is disengaged with at least one of the first and second pulleys.

4. The belt drive mechanism of claim 1, wherein the back-up gear is configured to operably connect the first gear, coupled to the first pulley, to the second gear, coupled to the second pulley in a state that the drive belt is disengaged with at least one of the first and second pulleys.

5. The belt drive mechanism of claim 1, wherein:
    the back-up gear does not contact the first and second gears coupled to the first and second pulleys in a state that the drive belt is engaged with the first and second pulleys, and
    the back-up gear engages with the first and second gears coupled to the first and second pulleys to rotate at least one of the first and second pulley and gear assemblies in a state that the drive belt is disengaged with at least one of the first and second pulleys.

6. The belt drive mechanism of claim 2, wherein the drive belt is configured to be driven by the driving pulley and drive the driven pulley in a state that the drive belt is engaged with the driving and driven pulleys.

7. The belt drive mechanism of claim 2, wherein the back-up gear is configured to be driven by the first gear coupled to the driving pulley and drive the second gear coupled to the driven pulley in a state that the drive belt is disengaged with at least one of the driving and driven pulleys.

8. The belt drive mechanism of claim 2, wherein:
    the drive belt is configured to be driven by the driving pulley and drive the driven pulley in a state that the drive belt is engaged with the driving and driven pulleys, and
    the back-up gear is configured to be driven by the first gear coupled to the driving pulley and drive the second gear coupled to the driven pulley in a state that the drive belt is disengaged with at least one of the driving and driven pulleys.

9. The belt drive mechanism of claim 1, wherein the first gear is fixed to the first pulley, and the second gear is fixed to the second pulley.

10. The belt drive mechanism of claim 1, wherein the teeth of the back-up gear are rotatably connected with the drive belt.

11. The belt drive mechanism of claim 1, further comprising an idler disposed adjacent to the drive belt and configured to adjust a tension of the drive belt.

12. The belt drive mechanism of claim 11, wherein the idler comprises an eccentric idler pulley.

13. A belt drive mechanism with gear back-up, comprising:
    a driving pulley to which a first gear is attached;
    a driven pulley to which a second gear is attached;
    a drive belt drivingly connecting the driving pulley to the driven pulley; and
    a back-up gear disposed between the first gear of the driving pulley and the second gear of the driven pulley, the back-up gear configured to operably connect the first gear of the driving pulley to the second gear of the driven pulley to rotate the driven pulley in a state that the drive belt is disengaged with at least one of the driving and driven pulleys.

14. The belt drive mechanism of claim 13, wherein, in a state that the drive belt is engaged with the driving and driven pulleys, teeth of the back-up gear are spaced apart from teeth of at least one of the first gear of the driving pulley and the second gear of the driven pulley while at least a portion of the teeth of the back-up gear is interposed between the teeth of the first and second gears of the driving and driven pulleys.

15. The belt drive mechanism of claim 13, wherein:
the back-up gear does not contact the first and second gears of the driving and driven pulleys in a state that the drive belt is engaged with the driving and driven pulleys, and
the back-up gear engages with the first and second gears of the driving and driven pulleys to rotate the driven pulley in a state that the drive belt is disengaged with at least one of the driving and driven pulleys.

16. The belt drive mechanism of claim 13, wherein the teeth of the back-up gear are rotatably connected with the drive belt.

17. The belt drive mechanism of claim 13, further comprising an idler disposed adjacent to the drive belt and configured to adjust a tension of the drive belt.

18. The belt drive mechanism of claim 17, wherein the idler comprises an eccentric idler pulley.

* * * * *